(12) United States Patent
Tabbara

(10) Patent No.: US 8,775,584 B2
(45) Date of Patent: Jul. 8, 2014

(54) METHOD AND APPARATUS FOR DISCOVERING NETWORK DEVICES

(75) Inventor: Bassam Tabbara, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1733 days.

(21) Appl. No.: 10/425,304

(22) Filed: Apr. 29, 2003

(65) Prior Publication Data

US 2004/0221041 A1 Nov. 4, 2004

(51) Int. Cl.
*H04L 12/28* (2006.01)
*G06F 15/173* (2006.01)
*H04L 29/14* (2006.01)
*H04L 29/08* (2006.01)

(52) U.S. Cl.
CPC ............ *H04L 67/1095* (2013.01); *H04L 69/40* (2013.01)
USPC .......................................... 709/223; 370/389

(58) Field of Classification Search
CPC ............ H04L 12/4641; H04L 12/4645; H04L 12/465
USPC ........................... 709/206, 224–227; 370/389
See application file for complete search history.

(56) References Cited

U.S. PATENT DOCUMENTS

| 5,319,633 | A | 6/1994 | Geyer et al. |
| 5,606,669 | A | 2/1997 | Bertin et al. |
| 5,706,440 | A | 1/1998 | Compliment et al. |
| 5,732,086 | A | 3/1998 | Liang et al. |
| 5,737,318 | A | 4/1998 | Melnik |
| 5,793,975 | A | 8/1998 | Zeldin |
| 6,188,675 | B1 | 2/2001 | Casper et al. |
| 6,477,572 | B1 | 11/2002 | Elderton et al. |
| 6,483,812 | B1 | 11/2002 | Prorock |
| 7,385,973 | B1 * | 6/2008 | Johnson et al. .............. 370/389 |
| 2002/0154606 | A1 | 10/2002 | Duncan et al. |
| 2002/0156898 | A1 | 10/2002 | Poirier et al. |
| 2003/0097438 | A1 * | 5/2003 | Bearden et al. .............. 709/224 |
| 2003/0179742 | A1 * | 9/2003 | Ogier et al. .................. 370/351 |
| 2004/0172467 | A1 * | 9/2004 | Wechter et al. .............. 709/224 |

FOREIGN PATENT DOCUMENTS

| AU | 2004201420 A1 | 11/2004 |
| EP | 1473872 | 11/2004 |
| WO | WO03024022 | 3/2003 |

OTHER PUBLICATIONS

Lin, et al., Automatic Topology Discovery of IP Networks, IEICE Trans. Inf. & Syst., vol. E83-D, No. 1, Jan. 2000, pp. 71 through 79.
Lowekamp, et al., Topology Discovery for Large Ethernet Networks; The Association for Computing Machinery, pp. 237 through 248.
Cisco Systems Inc., Understanding Spanning-Tree Protocol, from www.cisco.com wet site, 1997, 8 pages.
Jia, et al., "Automatic Topology Discovery Algorithm for Network Management System," Huazhong Univ. of Sci. & Tech., vol. 26, No. 1, Jan. 1998, pp. 15-17.

(Continued)

*Primary Examiner* — Chirag R Patel

(74) *Attorney, Agent, or Firm* — Jim Sfekas; Kate Drakos; Micky Minhas

(57) ABSTRACT

Multiple devices are identified in a network along with connection information associated with the multiple devices. The connection information associated with the multiple devices is converted into a hierarchical structure and communication links between the multiple devices are identified.

43 Claims, 8 Drawing Sheets

(56) References Cited

OTHER PUBLICATIONS

Official Notice of Rejection for Russia Patent Application No. 2004113259 mailed on Jun. 7, 2008, Pages 14.
The Canadian Office Action mailed Jul. 27, 2011 for Canadian patent application No. 2462,554, a counterpart foreign application of U.S. Appl. No. 10/425,304, 2 pgs.
The Korean Office Action mailed Jul. 28, 2011 for Korean patent application No. 10-2004-29378, a counterpart foreign application of U.S. Appl. No. 10/425,304, 3 pages.
Lin, et al., "Automatic Topology Discovery of IP Networks", IEICE Transactions on Information and Systems, Institute of Electronics Information and Comm. Eng. Tokyo, JP, vol. E83-D, No. 1, Jan 2000 pp. 71-79.
Lin et al., "An Alogorithm for Automatic Topology Discovery of IP Networks", IEEE International Conference on Communications, 1998, vol. 2, 5 pages.

* cited by examiner

METHOD AND APPARATUS FOR DISCOVERING NETWORK DEVICES

TECHNICAL FIELD

The systems and methods described herein relate to an architecture for discovering devices in a network environment and determining a relationship between those devices.

BACKGROUND

Internet usage has exploded over the past several years and continues to grow. People have become very comfortable with many services offered on the World Wide Web (or simply "Web"), such as electronic mail, online shopping, gathering news and other information, listening to music, viewing video clips, looking for jobs, and so forth. To keep pace with the growing demand for Internet-based services, there has been tremendous growth in the computer systems dedicated to hosting Web sites, providing backend services for those sites, and storing data associated with those sites.

One type of distributed computer system is an Internet data center (IDC), which is a specifically designed center that houses many computers for hosting Internet-based services. IDCs, which are also referred to as "Web farms" or "server farms", typically contain hundreds to thousands of computers in climate-controlled, physically secure buildings. These computers are interconnected to run one or more programs supporting one or more Internet services or Web sites. IDCs provide reliable Internet access, reliable power supplies, and a secure operating environment.

A particular data center may include, for example, multiple computers (such as general purpose computers), multiple storage devices and multiple data handling devices, such as routers, hubs, gateways and switches. The various devices and computers are interconnected with each other and other networks, such as the Internet, thereby allowing the communication of data between various devices in the data center.

Existing systems utilize a significant amount of manual control of the computers and other devices in a data center. For example, when a new resource (such as a computer system) is added to a data center, certain manual steps may be performed to configure the new resource and to notify other devices in the data center of the availability of the new resource. These manual operations are time-consuming and may not be performed for some time if an administrator is busy with other tasks.

Accordingly, there is a need for improved techniques for discovering network topologies and managing various devices in a network.

SUMMARY

The systems and methods described herein discover various devices in a network environment and determine relationships between those devices. The systems and methods also monitor the network devices and communication links between the devices to maintain a current database of information regarding all devices in the network.

In one embodiment, multiple devices in a network are identified along with connection information associated with the multiple devices. The connection information is converted into a hierarchical structure. This embodiment then identifies communication links between the devices.

BRIEF DESCRIPTION OF THE DRAWINGS

Similar reference numbers are used throughout the figures to reference like components and/or features.

DETAILED DESCRIPTION

The systems and methods described herein relate to discovering multiple devices in a network environment and identifying a relationship between those devices. These systems and methods automate certain tasks that would otherwise be performed manually. A database maintains information about the multiple devices in the network environment and the manner in which the devices are coupled to one another.

Various examples discussed herein refer to networks and network environments. As used herein, a "network" is any collection of two or more devices coupled to one another such that the devices can exchange data with one another. A data center, such as an Internet data center (IDC), represents one example of a network environment. The various devices in a network environment may be located in a common area or located at different geographic locations. A particular network environment may include one or more sub-networks coupled to one another. The networks discussed herein may utilize any data communication protocol and any type of data communication medium.

As used herein, a "network device" is any device or system coupled to or contained in a network. A network device may also be referred to as a network node. Example network devices include any type of computer system, storage system, bridge, router, switch, hub, network discovery system, and the like.

In particular embodiments, SNMP (Simple Network Management Protocol) is used to communicate between various network devices. SNMP is a set of protocols for managing networks. SNMP sends messages, called protocol data units (PDUs) to different parts of a network. SNMP-compliant devices (referred to as "agents") store data about themselves in Management Information Bases (MIBs) and return this data to SNMP requesters. In alternate embodiments, other protocols may be used instead of or in addition to SNMP.

Figure 1:
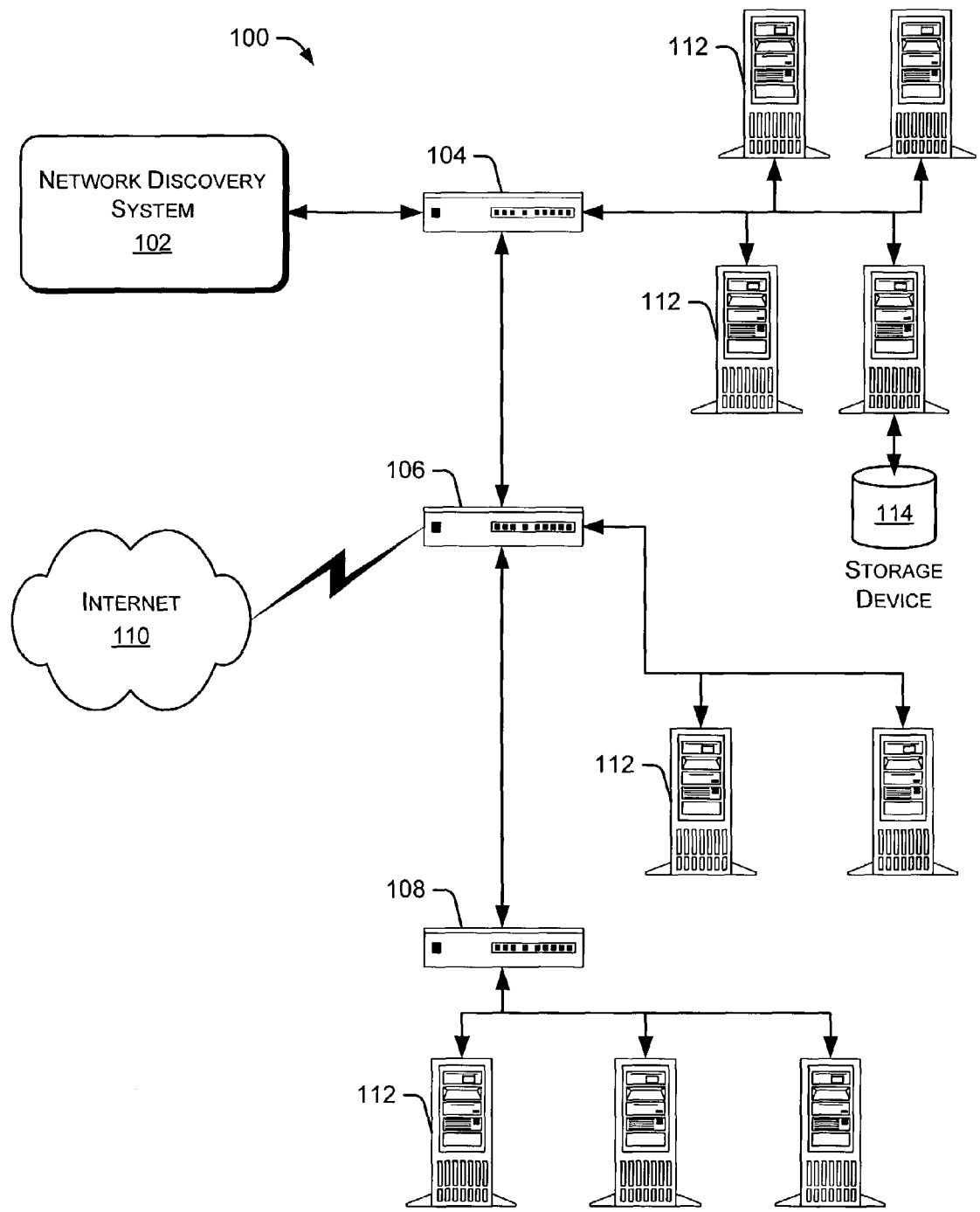
FIG. 1 shows an exemplary network environment.

FIG. 1 shows an exemplary network environment 100. A network discovery system 102 is coupled to a bridge 104. As described herein, network discovery system 102 is capable of discovering various devices in a network environment and discovering communication links between the network devices. Additionally, network discovery system 102 monitors the network devices for proper operation and maintains a database of information regarding the devices in the network and the manner in which those devices are coupled to one another. Bridge 104 is a device that connects two or more segments of the same network using a common protocol, such as Ethernet or Token-Ring. In one embodiment, bridge 104 contains multiple communication ports for sending and receiving data. Bridge 104 maintains a forwarding table associated with each port. Each forwarding table contains addresses (e.g., MAC addresses) of other network devices coupled to the port.

Bridge 104 is coupled to four computing devices 112 and another bridge 106. Bridge 104 is coupled to computing devices 112 via, for example, a bus or multiple individual connections between the bridge and each of the computing devices. Computing devices 112 may be any type of computer, including servers, workstations, laptop computers, portable computers, and the like. One of the computing devices 112 is coupled to a storage device 114 for storing data.

Bridge 106 is coupled to the Internet 110, two computing devices 112 and another bridge 108. Bridge 108 is coupled to three computing devices 112. The arrangement of network devices shown in FIG. 1 allows any network device to exchange data with any other network device in network environment 100.

Although bridges 104, 106 and 108 in FIG. 1 are shown coupled to a small number of computing devices 112, a particular bridge may be connected to any number of computing devices or other network devices. An embodiment of a bridge 104, 106 or 108 may be coupled to hundreds or thousands of different network devices. Alternate network environments may include other types of network devices, such as routers, gateways, switches, hubs, and the like.

Figure 2:
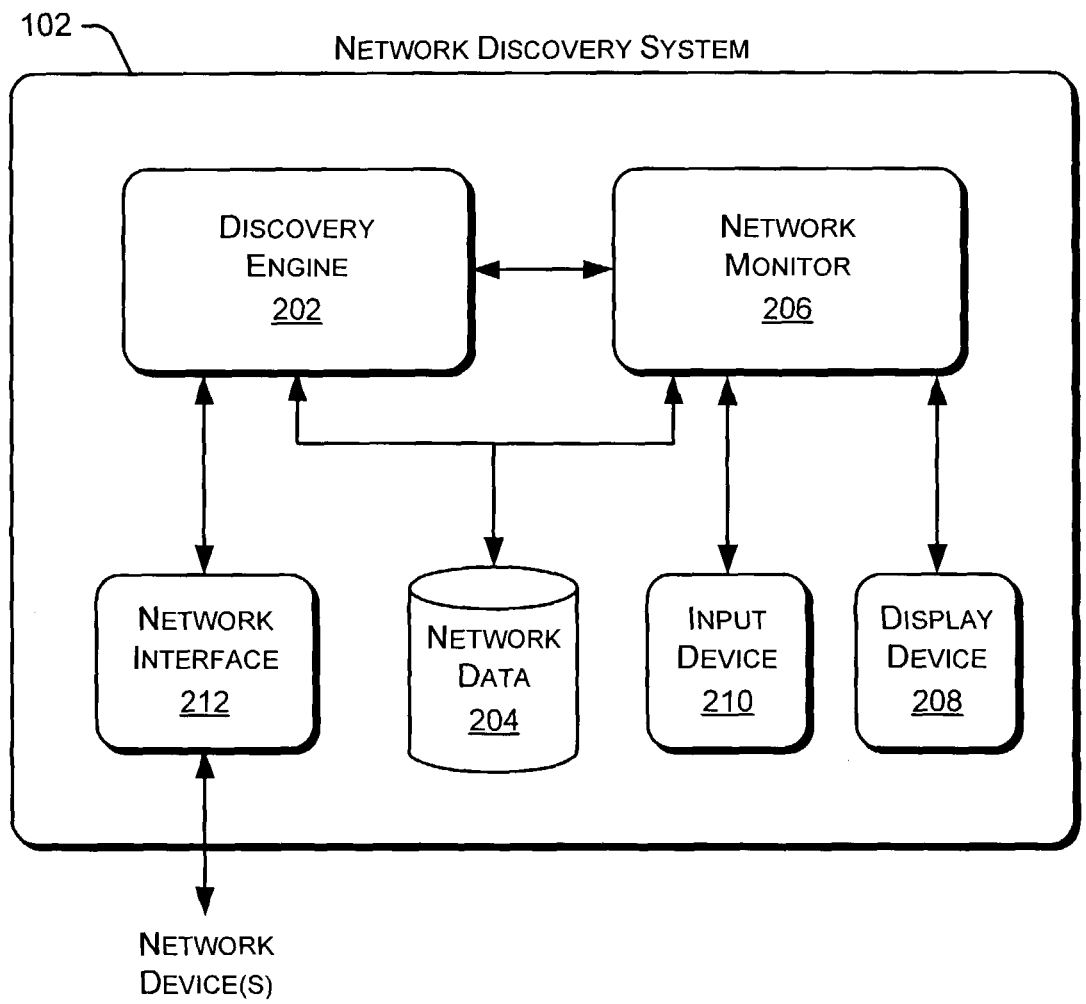
FIG. 2 is a block diagram illustrating an embodiment of a network discovery system.

FIG. 2 is a block diagram illustrating an embodiment of network discovery system 102. Network discovery system 102 includes a discovery engine 202, a storage device 204 to store network data, a network monitor 206 and a display device 208. Discovery engine 202 discovers network devices in a network environment, identifies communication links between the network devices and determines the topology of the network environment. The data collected and generated by discovery engine 202 is stored in storage device 204.

Network monitor 206, in combination with discovery engine 202, monitors the network environment to identify changes in the network, such as the addition of new network devices, the removal of network devices and changes to communication links between the network devices. The data stored in storage device 204 is updated by network monitor 206 to reflect any changes in network environment 100. Network monitor 206 is coupled to a display device 208, which allows a user (such as a network administrator) to view the network topology, the status of one or more network devices, or any other information retrieved or generated by network discovery system 102. A user input device 210 is also coupled to network monitor 206 and allows the user to provide input to the network monitor. Input device 210 may be, for example, a keyboard, a mouse, a track pad, a touch pad, etc. Network monitor 206 allows a user, such as a network administrator, to retrieve information about the network (e.g., network information stored in storage device 204).

A network interface 212 is coupled to discovery engine 202 and allows the discovery engine to communicate with other network devices in a network environment. Network interface 212 is coupled to one or more network devices in network environment 100.

Figure 3:
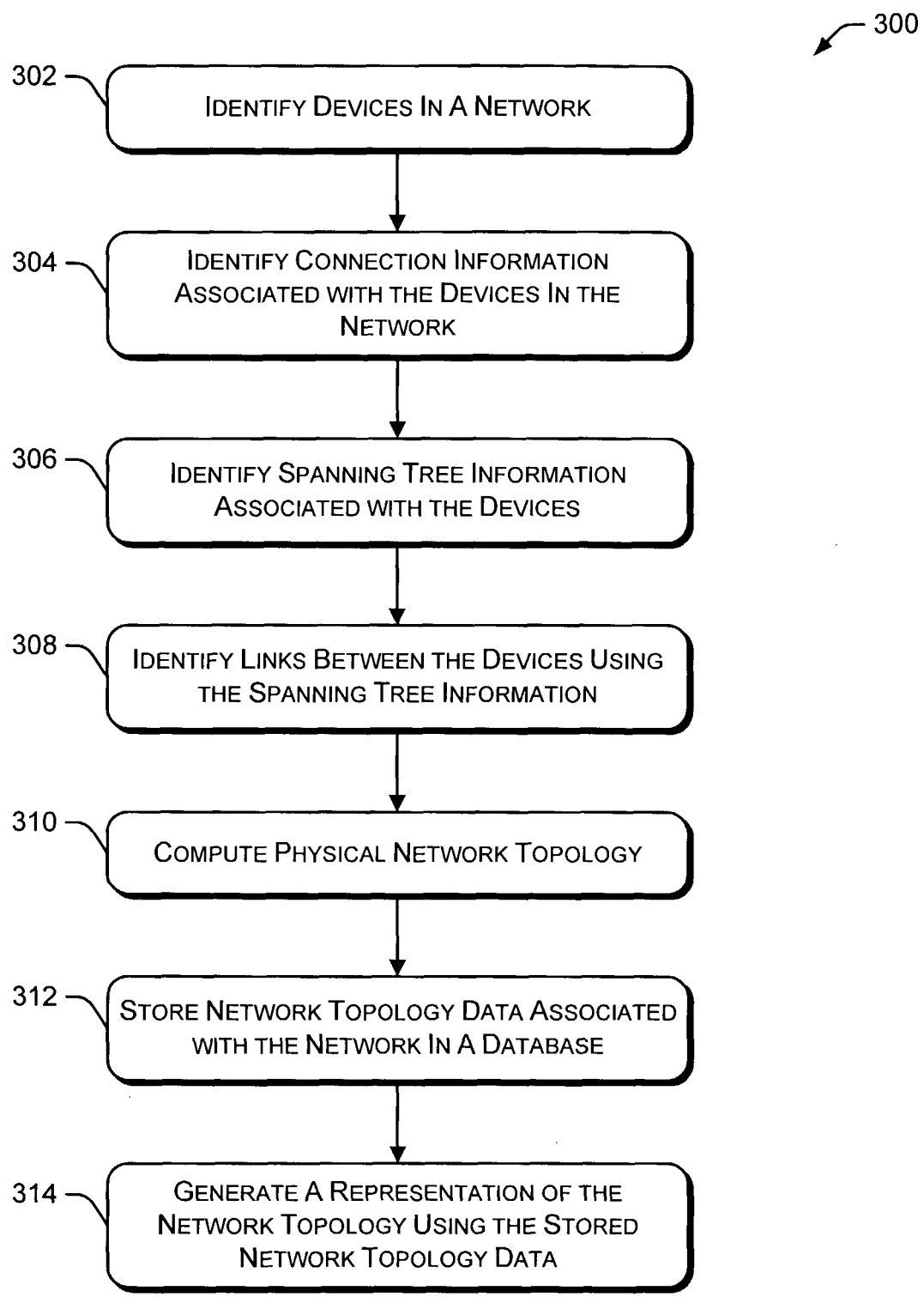
FIG. 3 is a flow diagram illustrating an embodiment of a procedure for discovering devices in a network and the topology of the network.

FIG. 3 is a flow diagram illustrating an embodiment of a procedure 300 for discovering devices in a network and the topology of the network topology. Procedure 300 can be implemented by, for example, network discovery system 102. Initially, procedure 300 identifies devices in a network (block 302). This identification can be performed, for example, by pinging various network addresses (also referred to as Internet Protocol (IP) addresses), as discussed below. The procedure then identifies connection information associated with the devices in the network (block 304). Connection information is identified by retrieving information from each of the identified network devices, as discussed below.

At block 306, the procedure identifies spanning information associated with the devices identified above. Spanning trees are generated by devices, such as switches, using a standard algorithm. In one embodiment, procedure 300 retrieves spanning information from one or more devices in the network. The spanning tree information is useful in computing the physical network topology. The spanning tree protocol is a link management protocol that provides path redundancy while preventing undesirable loops in a network. For example, for an Ethernet network to function properly, there should be a single active path between two network nodes. If multiple active paths exist between two network nodes, a loop may result. When a loop exists, the potential exists for a duplication of messages. The spanning tree protocol forces certain redundant data paths into a standby (i.e., blocked) state. Additionally, one or more bidirectional communication links between network nodes may be converted to unidirectional links.

After identifying spanning tree information at block 306, the procedure of FIG. 3 continues by identifying links between the network devices using information contained in the spanning tree (block 308). The procedure then computes the physical network topology (block 310). The procedure stores the network topology data associated with the network in a database (block 312), such as storage device 204 (FIG. 2). Finally, procedure 300 generates a representation of the network topology using the stored network topology data (block 314). This representation of the network topology can be displayed on a display device, printed on a printer, or otherwise rendered for a network administrator or other user. The representation of the network topology may be saved for future reference and/or communicated to another system or user.

Although particular examples discussed herein utilize information contained in one or more spanning trees, alternate embodiments may use other protocols and/or processes to eliminate undesirable loops in a network.

Figure 4:
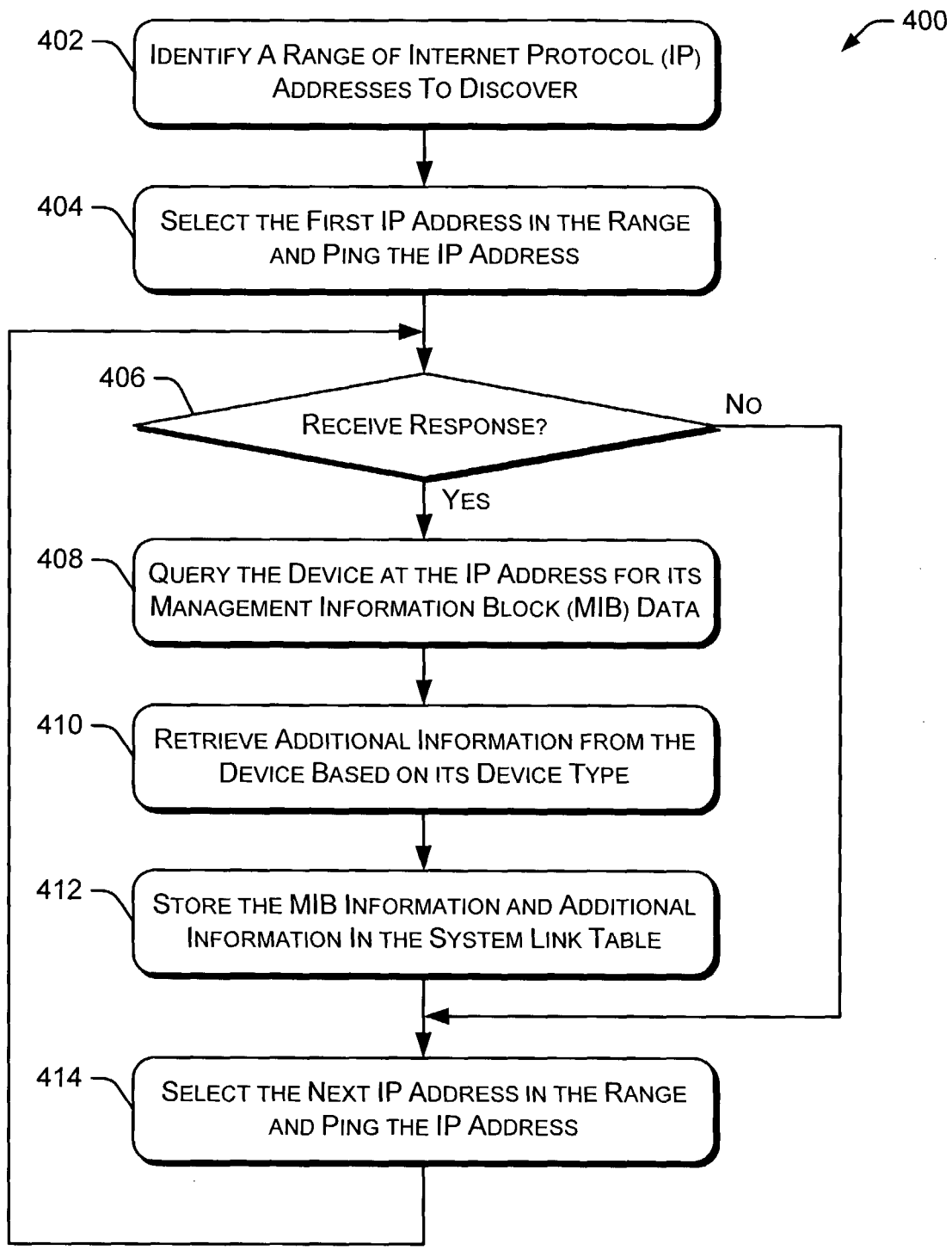
FIG. 4 is a flow diagram illustrating an embodiment of a procedure for identifying and obtaining information from network devices.

FIG. 4 is a flow diagram illustrating an embodiment of a procedure 400 for identifying and obtaining information from network devices. Initially, procedure 400 identifies a range of IP addresses to discover (block 402). This may be a continuous range of IP addresses or any number of non-continuous IP addresses. The range of IP addresses may be specified by a network administrator or the discovery engine may scan the entire IP address space. The procedure selects the first IP address in the range and pings the IP address (block 404). If a response is not received, the procedure selects the next IP address in the range and pings that IP address (block 414).

If a response is received after pinging an IP address, the procedure queries the network device associated with the IP address to obtain its management information base (MIB) data (block 408). In one embodiment, this query is an SNMP query that receives information from the device's system table (discussed below with respect to FIG. 5). A MIB is a database of objects that can be monitored, for example, by a network management system. After receiving the MIB data, procedure 400 retrieves additional information from the network device based on its device type (block 410). The device type information is part of the MIB data received from a network device. For example, if the device type is a computer system, the procedure retrieves information regarding the computer system (e.g., type of processor, memory capacity, hard disk storage capacity, and the like). If the device type is a bridge, the procedure retrieves additional information using a MIB that provides information specific to bridges.

After retrieving additional information from the device based on its device type, the procedure stores the MIB information and additional information in a system link table (block 412). The system link table is discussed below. The procedure then selects the next IP address in the range and pings the IP address (block 414). The procedure returns to block 406 to determine whether a response is received from the IP address.

Figure 5:
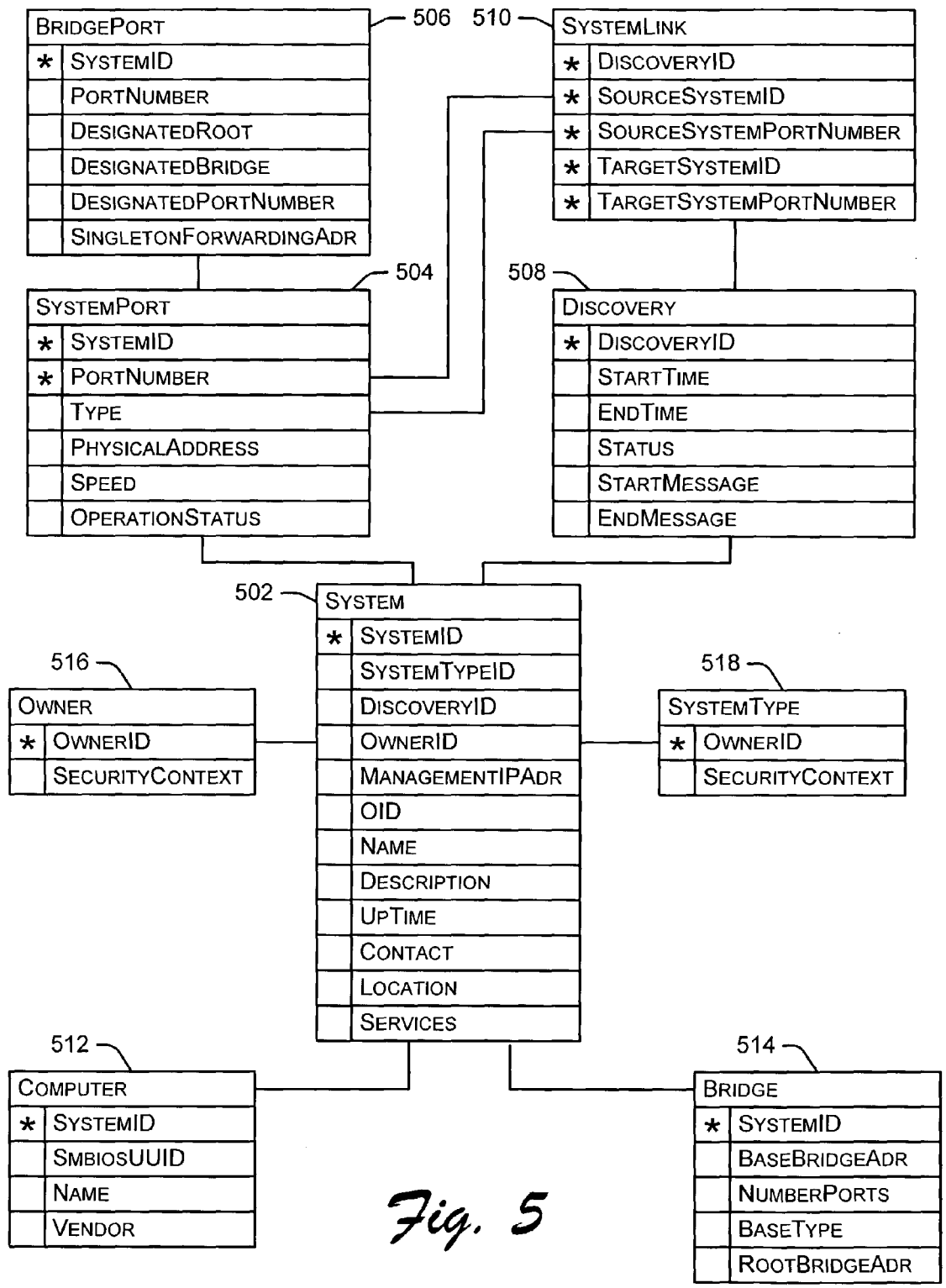
FIG. 5 illustrates a data storage structure for storing data related to various network devices and communication links between network devices.

FIG. 5 illustrates a data storage structure for storing data related to various network devices and communication links between network devices. The data storage structure of FIG. 5 is used to build a hierarchy of network devices. A "System" table 502 represents the main table for maintaining information regarding network devices. In System table 502, the "SystemID" field is an identifier associated with each system (or device). "SystemID" is unique within the data storage structure of FIG. 5. "SystemTypeID" identifies the type of device (e.g., computer, bridge, etc.). "DiscoveryID" is the identification of the discovery process during which the device was discovered. "OwnerID" identifies the owner of the device, such as a network resource manager. "ManagementIPAdr" is the IP address at which the device was discovered. "OID" refers to an object ID, which represents the manufacturer, model, etc. associated with the device. "Name" is the name of the device. "Description" represents a description of the device. "UpTime" identifies how long the device has been "up" or active. "Contact" identifies a user or operator responsible for the device. "Location" identifies the physical location of the device (e.g., rack 4, shelf B). "Services" identify the type of services provided by the device, such as storage services, routing services, etc.

A "SystemPort" table 504 is associated with System table 502. There is a separate SystemPort table 504 for each port on the associated system or device (identified by SystemID). "PortNumber" represents a particular port (e.g., network communication port) on the device. "Type" identifies the port type, such as 10 Mb/sec. "PhysicalAddress" is the address of the port, such as the MAC address, Phy Net address, and the like. "Speed" is the communication speed of the port. "OperationStatus" is the most recent identified status of the port.

A "BridgePort" table 506 is also associated with System table 502. "DesignatedRoot" is the address of the designated root of the spanning tree. "DesignatedBridge" is the address of another bridge if this port is connected to another bridge. Otherwise, "DesignatedBridge" is null. "DesignatedPortNumber" is the port on the other bridge, if any. "SingletonForwardingAdr" is a single address for forwarding data. If the forwarding table for a specific bridge port contains only one address, the value of SingletonForwardingAdr is set to that address. Otherwise, the value of SingletonForwardingAdr is null. SingletonForwardingAdr is useful in identifying leaf devices coupled to a switch port.

A "Discovery" table 508 is associated with System table 502. A separate "DiscoveryID" is associated with each execution of the discovery process. "StartTime" is the time that the discovery process started and "EndTime" is the time that the discovery process finished. "Status" identifies whether the discovery process was successful or whether an error occurred. "StartMessage" and "EndMessage" identify messages generated at the start of the discovery process and at the end of the discovery process.

A "SystemLink" table 510 is associated with System table 502. SystemLink table 510 contains information regarding various links coupled to the system identified by SystemID. "SourceSystemID" identifies the system that represents the source of the link and "SourceSystemPortNumber" identifies the port associated with the source of the link. "TargetSystemID" identifies the system that is the target of the link and "TargetSystemPortNumber" identifies the port associated with the target of the link.

A "Computer" table 512 is associated with System table 502. "SmbiosUuid" is a unique identifier associated with the computer. "Name" is the name of the computer and "Vendor" identifies the vendor of the computer as well as information about the computer (such as installed memory, processor type, and number of hard disks).

A "Bridge" table 514 is also associated with System table 502. "BaseBridgeAdr" is a unique identifier associated with the bridge. "NumberPorts" identifies the number of ports supported by the bridge. "BaseType" identifies the type of bridging supported, such as source level bridging. "RootBridgeAdr" is the address of the root of the spanning tree.

An "Owner" table 516 provides information regarding the owner of the system or device. A "SystemType" table 518 provides information specific to the type of system.

"Bridge" and "Computer" are both subtypes of "System". Although only two subtypes (Bridge and Computer) are discussed herein, alternate embodiments include other subtypes (all of which are subtypes of the same System table), such as "Storage", "Load Balancers", "Hardware", etc.

Entries in FIG. 5 shown with a "*" are unique identifiers (such as the SystemID, the DiscoveryID, and the PortNumber). All entries in the SystemLink table 510 have an associated "*", indicating that the entries are all part of the primary key for that table.

The data storage structure illustrated in FIG. 5 is used to store information discovered regarding network devices and communication links between network devices. The stored information is updated as the network topology changes (e.g., as a result of adding new devices and links, or as a result of removing existing devices and links).

After identifying various network devices using the procedure of FIG. 4, the network discovery system computes the various links between the identified network devices. As the link information is computed, the information is stored in the data structure of FIG. 5. In particular, the link information is stored in SystemLink table 510.

Figure 6:
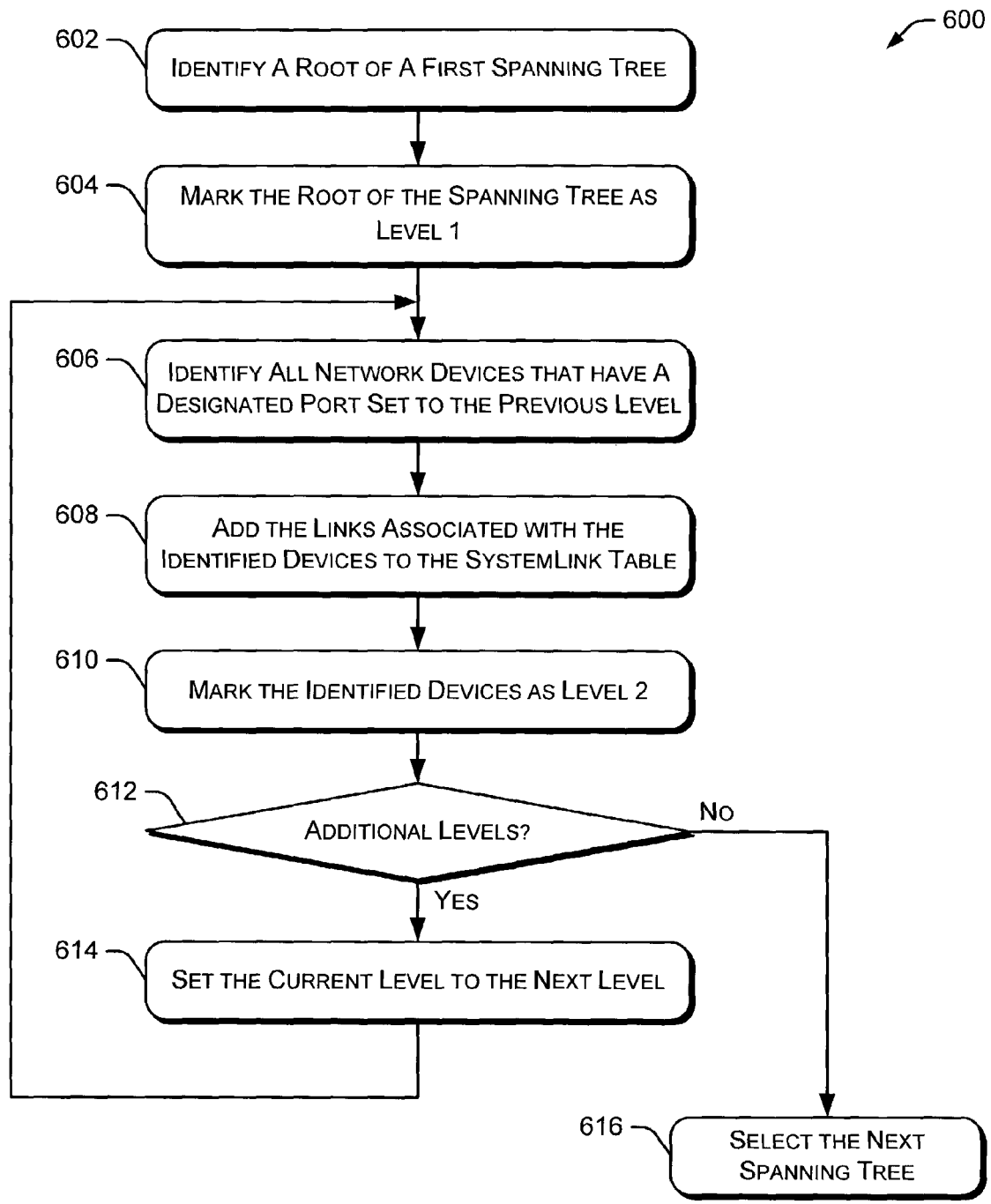
FIG. 6 is a flow diagram illustrating an embodiment of a procedure for identifying link information associated with the network devices identified using the procedure of FIG. 4.

FIG. 6 is a flow diagram illustrating an embodiment of a procedure 600 for identifying link information associated with the network devices identified using the procedure of FIG. 4. If there are multiple spanning trees associated with the network devices, procedure 600 is performed for each spanning tree. Initially, procedure 600 identifies a root of a first spanning tree (block 602). The root of the spanning tree is marked as Level 1 (block 604). At block 606, the procedure then identifies all network devices in the next level (i.e., Level 2) that have a designated port set to the previous level (i.e., Level 1). The procedure then adds the links associated with the identified devices to the SystemLink table (block 608). The identified devices are marked as Level 2 (block 610). The procedure then determines whether there are additional levels of network devices (block 612). If there are additional levels, the current level is set to the next level (block 614), and the procedure returns to block 606 to identify network devices having a port set to the previous level. If there are no additional levels, the procedure branches to block 616 and selects the next spanning tree, if any. After all spanning trees have been analyzed by the procedure of FIG. 6, the process of filling the SystemLink table is complete.

Figure 7:
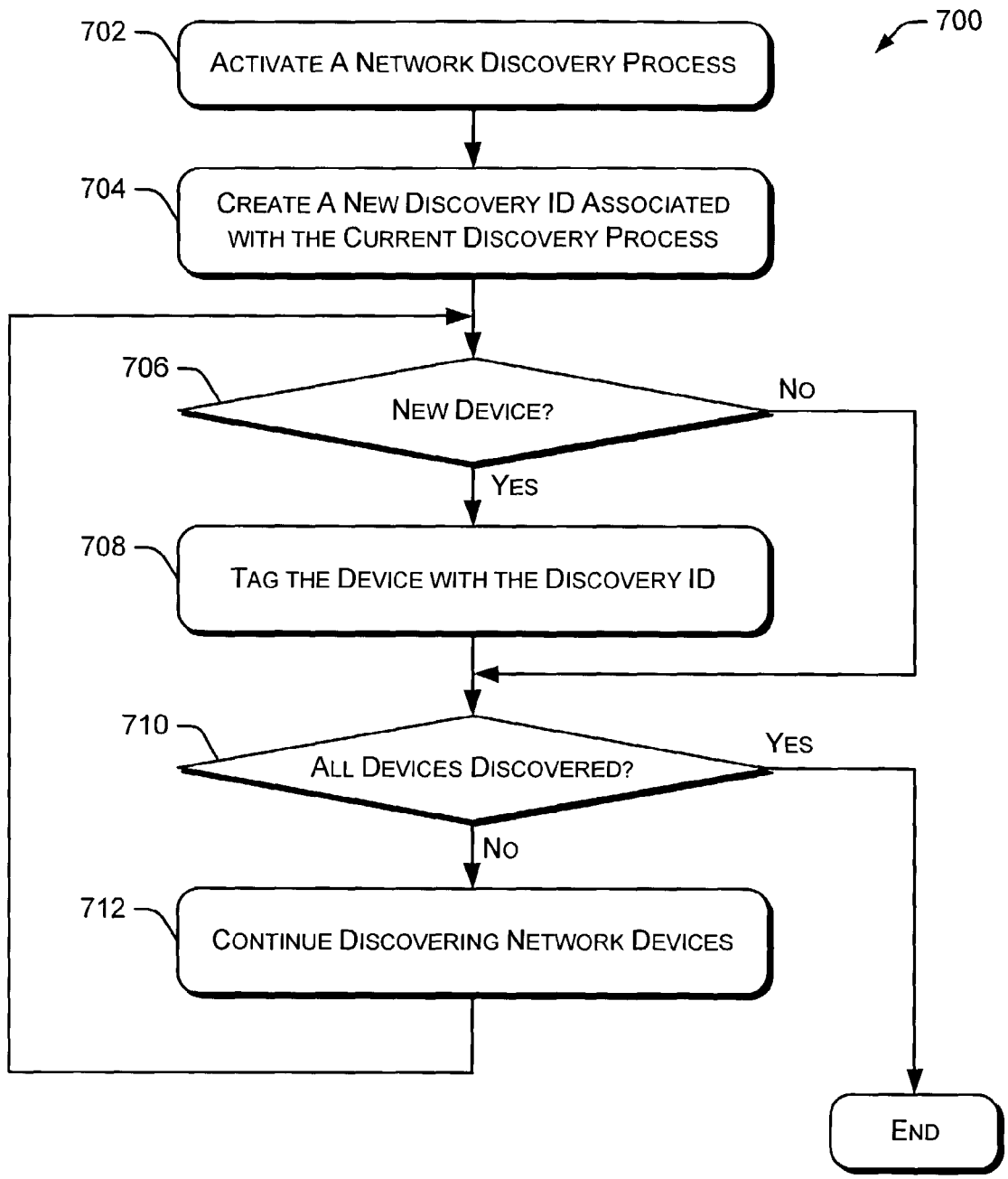
FIG. 7 is a flow diagram illustrating an embodiment of a procedure for discovering network devices.

FIG. 7 is a flow diagram illustrating an embodiment of a procedure 700 for discovering network devices. Procedure 700 can be performed in response to a user request, after a predetermined time period, after a particular event occurs, or any other triggering criteria. In a particular embodiment, the network discovery process is performed every 10-15 minutes. The network discovery process is used to monitor the status of network devices and communication links in a network environment. By maintaining the current status of the network devices and communication links (e.g., active or inactive), the network discovery system is able to maintain an accurate understanding of the network topology.

The network discovery procedure is activated (or triggered) at block 702. The procedure creates a new discovery ID associated with the current network discovery process (block 704). Discovery IDs may be issued sequentially or according to another predetermined pattern. Each discovery ID is unique.

The procedure discovers new network devices and identifies new network links (block 706). These new devices may be associated with IP addresses that did not previously respond to pinging. If any new devices are discovered, they are tagged with the discovery ID (block 708). If no new devices are discovered, the procedure continues to block 710 to determine whether all devices have been discovered (i.e., the full range of IP addresses has been searched). If all currently active devices have been discovered, the procedure ends. Otherwise, the procedure continues discovering network devices (block 712) and returns to block 706 to determine whether a new network device or a new network link has been discovered.

If a particular network device was previously discovered, but has not been discovered during recent network discovery processes, the status of the device may be changed to "inactive". In one embodiment, the status of a particular network device is changed to inactive if a response has not been received from the device or link for more than one hour.

Figure 8:
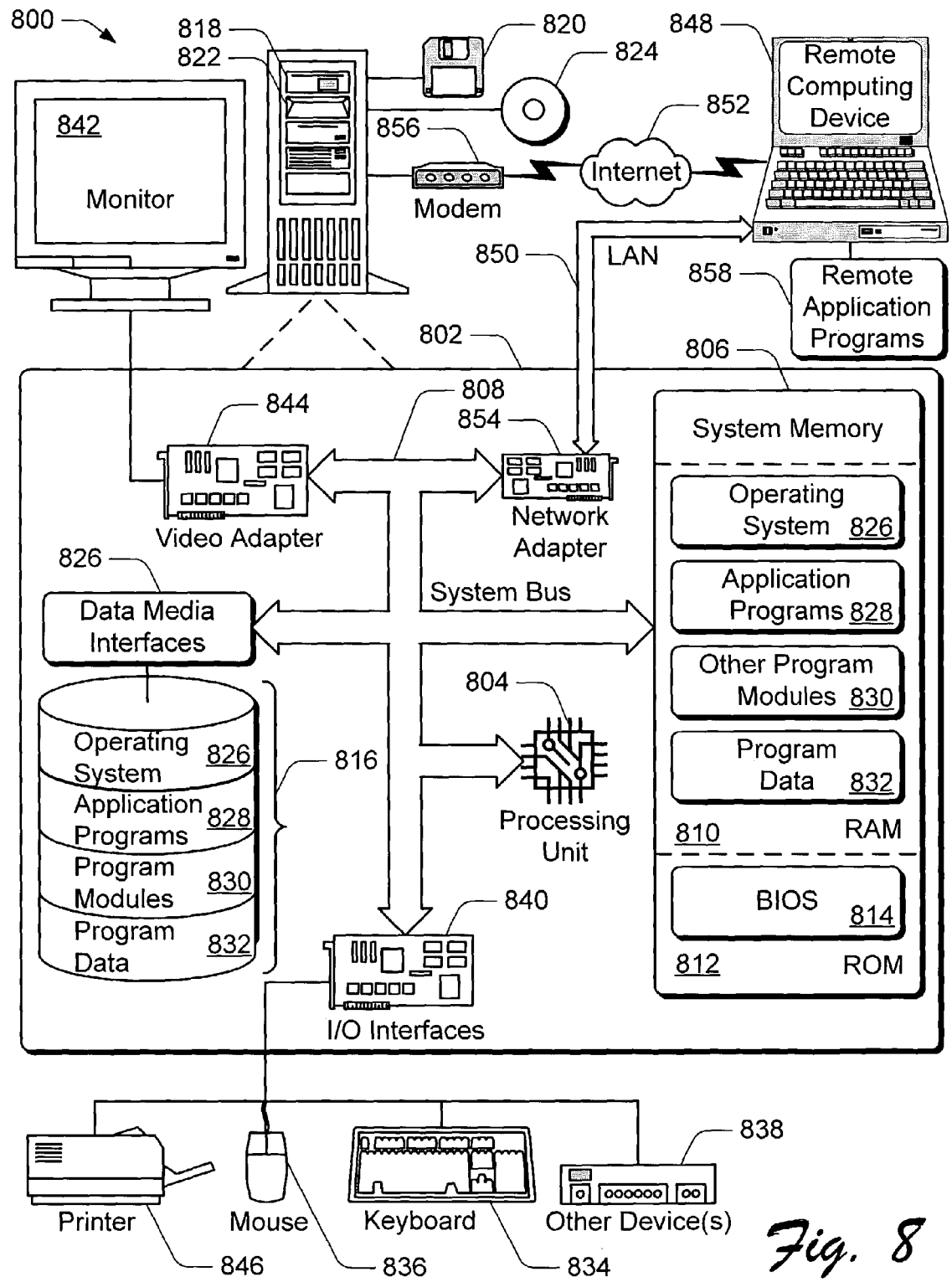
FIG. 8 illustrates an example of a computing environment.

FIG. 8 illustrates an example of a computing environment 800 within which the data carousel systems and methods, as well as the computer, network, and system architectures described herein, can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 800 includes a general-purpose computing system in the form of a computing device 802. The components of computing device 802 can include, by are not limited to, one or more processors 804 (e.g., any of microprocessors, controllers, and the like), a system memory 806, and a system bus 808 that couples various system components including the processor 804 to the system memory 806. The one or more processors 804 process various computer-executable instructions to control the operation of computing device 802 and to communicate with other electronic and computing devices.

The system bus 808 represents any number of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 800 typically includes a variety of computer-readable media. Such media can be any available media that is accessible by computing device 802 and includes both volatile and non-volatile media, removable and non-removable media. The system memory 806 includes computer-readable media in the form of volatile memory, such as random access memory (RAM) 810, and/or non-volatile memory, such as read only memory (ROM) 812. A basic input/output system (BIOS) 814, containing the basic routines that help to transfer information between elements within computing device 802, such as during start-up, is stored in ROM 812. RAM 810 typically contains data and/or program modules that are immediately accessible to and/or presently operated on by the processing unit 804.

Computing device 802 can also include other removable/non-removable, volatile/non-volatile computer storage media. By way of example, a hard disk drive 816 is included for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD, or any other type of optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer-readable instructions, data structures, program modules, and other data for computing device 802. Although the example illustrates a hard disk 816, a removable magnetic disk 820, and a removable optical disk 824, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of the systems and methods for a test instantiation system.

Computing device 802 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 802 via input devices such as a keyboard 834 and a pointing device 836 (e.g., a "mouse"). Other input devices 838 (not shown specifically) may include a microphone, joystick, game pad, controller, satellite dish, serial port, scanner, and/or the like. These and other input devices are connected to the processing unit 804 via input/output interfaces 840 that are coupled to the system bus 808, but may be connected by other interface and bus structures, such as a parallel port, game port, and/or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computing device 802 via the input/output interfaces 840.

Computing device 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computing device 802.

Logical connections between computing device 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computing device 802 is connected to a local network 850 via a network interface or adapter 854. When implemented in a WAN networking environment, the computing device 802 typically includes a modem 856 or other means for establishing communications over the wide network 852. The modem 856, which can be internal or external to computing device 802, can be connected to the system bus 808 via the input/output interfaces 840 or other appropriate mechanisms. It is to be appreciated that the illustrated network connections are exemplary and that other means of establishing communication link(s) between the computing devices 802 and 848 can be employed.

In a networked environment, such as that illustrated with computing environment 800, program modules depicted relative to the computing device 802, or portions thereof, may be stored in a remote memory storage device. By way of example, remote application programs 858 reside on a memory device of remote computing device 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   initiating a particular instance of a device discovery process to identify devices in a network;
   issuing, by a processor, a discovery identifier that identifies the particular instance of the device discovery process;
   identifying a plurality of devices in the network during the particular instance of the device discovery process;
   tagging the plurality of devices in the network that are identified during the particular instance of the device discovery process with the discovery identifier that identifies the particular instance of the device discovery process;
   identifying connection information associated with the plurality of devices;
   converting the connection information associated with the plurality of devices into a hierarchical structure; and
   identifying communication links between the plurality of devices.

2. A method as recited in claim 1 wherein the devices include network routing devices.

3. A method as recited in claim 1 wherein the devices include computing systems.

4. A method as recited in claim 1 wherein identifying communication links between the plurality of devices includes:
   identifying a range of internet protocol (IP) addresses to analyze;
   querying individual IP addresses in the range of IP addresses; and
   if a response to the query is received, requesting management information base data from the responding device.

5. A method as recited in claim 4 further comprising retrieving additional information about the responding device if a response to the query is received.

6. A method as recited in claim 1 wherein converting the connection information associated with the plurality of devices into a hierarchical structure includes generating a spanning tree associated with the plurality of devices.

7. A method as recited in claim 1, wherein the particular instance of the device discovery process has a start time and an end time.

8. A method as recited in claim 1, further comprising:
   computing a network topology based at least in part on the hierarchical structure and the communication links; and
   storing the network topology data in association with the network.

9. A method as recited in claim 7, wherein storing the network topology data includes storing the network topology data in at least one system link table.

10. A method as recited in claim 7, wherein storing the network topology data includes storing device identities, discovery identifiers from multiple instances of the device discovery process, connection identities, and links between devices.

11. A method as recited in claim 8 further comprising generating a representation of the network topology.

12. A method as recited in claim 11, further comprising causing the representation of the network topology to be rendered.

13. A method comprising:
initiating a particular instance of a device discovery process to identify devices in a network;
issuing, by a processor, a discovery identifier that identifies the particular instance of the device discovery process;
identifying a plurality of devices in the network during the particular instance of the device discovery process;
tagging the plurality of devices in the network that are identified during the particular instance of the device discovery process with the discovery identifier that identifies the particular instance of the device discovery process;
identifying connection information associated with the plurality of devices;
identifying spanning tree information associated with the plurality of devices; and
identifying communication links between the plurality of devices using the spanning tree information.

14. A method as recited in claim 13 wherein the devices include network routing devices.

15. A method as recited in claim 13 wherein the devices include computing systems.

16. A method as recited in claim 14, wherein identifying links between the plurality of devices includes:
identifying a range of internet protocol (IP) addresses to analyze;
querying individual IP addresses in the range of IP addresses; and
if a response to the query is received, requesting management information base data from the responding device.

17. A method as recited in claim 16 further comprising retrieving additional information about the responding device if a response to the query is received.

18. A method as recited in claim 13, wherein the particular instance of the device discovery process has a start time and an end time.

19. A method as recited in claim 13, further comprising:
computing a network topology based at least in part on the connection information, the spanning tree information, and the communication links; and
storing network topology data in association with the network.

20. A method as recited in claim 19, wherein storing the network topology data includes storing device identities, discovery identifiers from multiple instances of the device discovery process, connection identities, and links between devices.

21. A method as recited in claim 19, wherein storing the network topology data includes storing the network topology data in at least one system link table.

22. A method as recited in claim 19, further comprising generating a representation of the network topology.

23. A method as recited in claim 22, further comprising causing the representation of the network topology to be rendered.

24. One or more computer-readable storage devices containing a computer program that is executable by the processor to perform the method recited in claim 13.

25. One or more computer-readable storage devices having stored thereon a computer program that, when executed by one or more processors, causes the one or more processors to perform operations comprising:
initiating a discovery process to identify devices in a network;
issuing, by the one or more processors, a discovery identifier that identifies a particular instance of the discovery process; and
tagging a plurality of devices in the network that are identified during the particular instance of the discovery process with the discovery identifier that identifies the particular instance of the device discovery process.

26. One or more computer-readable storage devices as recited in claim 25 wherein the plurality of devices in the network that are identified are computing devices and bridges.

27. The one or more computer-readable storage devices as recited in claim 25, wherein the one or more processors is further caused to:
identify a range of internet protocol (IP) addresses to discover;
query individuals of the IP addresses in the range of IP addresses;
if a response to the query is received:
request management information base data from a responding device;
identify a device type associated with the responding device; and
retrieve additional information from the responding device based on the device type associated with the responding device wherein the management information base data and the additional information are stored in a system link table.

28. A method comprising:
initiating a particular instance of a device discovery process to identify devices in a network;
issuing, by a processor, a discovery identifier that identifies the particular instance of the device discovery process;
identifying, during the particular instance of the device discovery process, a plurality of new devices in the network; and
tagging the plurality of new devices with the discovery identifier that identifies the particular instance of the device discovery process;
maintaining a status of each of the plurality of devices;
repeatedly querying individual devices of the plurality of devices;
recording responses received from individual devices of the plurality of devices; if no response is received from a particular device of the plurality of devices within a predetermined period of time:
changing the status of the particular device to inactive; and
notifying other devices of the plurality of devices in the network of the changed status of the particular device.

29. A method as recited in claim 28 wherein repeatedly querying individual devices of the plurality of devices in the network includes querying individual devices of the plurality of devices in the network at periodic intervals.

30. A method as recited in claim 28 wherein the predetermined period of time is on the order of one hour.

31. A method as recited in claim 28 further comprising notifying other application programs of the changed status of the particular device.

32. A method as recited in claim 28 further comprising:
identifying new communication links in the network; and
tagging the new communication links with the discovery identifier.

33. A method as recited in claim 28, further comprising storing the discovery identifier in association with network topology data identified based at least in part on the device discovery process.

34. A method as recited in claim 33, further comprising:
generating a representation of the network topology data; and
causing the representation of the network topology to be rendered.

35. An apparatus comprising:
a discovery engine coupled to a network, wherein the discovery engine is configured to:
issue a discovery identifier that identifies a particular instance of a discovery process;
identify and tag with the discovery identifier a plurality of network devices in the network that are identified during the particular instance of the device discovery process;
identify connection information associated with the plurality of network devices;
identify spanning tree information associated with the plurality of network devices; and
identify links between the plurality of network devices using the spanning tree information.

36. An apparatus as recited in claim 35 wherein the discovery engine is further configured to periodically update a status of network devices in the network.

37. An apparatus as recited in claim 35 further comprising a network monitor coupled to the discovery engine and configured to generate a display representing a network topology.

38. One or more computer-readable storage devices having stored thereon a computer program that, when executed by one or more processors, causes the one or more processors to:
initiate a particular instance of a discovery process to identify devices in a network;
issue a discovery identifier that identifies the particular instance of the discovery process;
identify a plurality of internet protocol (IP) addresses to discover;
query each IP address in the plurality of IP addresses;
if a query response is received during the particular instance of the discovery process:
tag a responding device with the discovery identifier that identifies the particular instance of the device discovery process;
request management information base data from the responding device;
identify a device type associated with the responding device; and
retrieve additional information from the responding device based on the device type associated with the responding device.

39. One or more computer-readable storage devices as recited in claim 38 wherein if no query response is received, the one or more processors are further caused to query a next IP address.

40. One or more computer-readable storage devices as recited in claim 38 wherein the device type is a bridge.

41. One or more computer-readable storage devices as recited in claim 38 wherein the device type is a computing device.

42. One or more computer-readable storage devices as recited in claim 38 wherein the plurality of IP addresses correspond to the IP addresses associated with a network environment.

43. One or more computer-readable storage devices as recited in claim 38, wherein the one or more processors are further caused to store the management information base data and the additional information in a system link table.

* * * * *